United States Patent [19]
Castleberry

[11] Patent Number: 5,576,859
[45] Date of Patent: Nov. 19, 1996

[54] DEVICE FOR IMPROVING THE CONTRAST OF A LIQUID CRYSTAL SCREEN AND ITS METHOD OF MANUFACTURE THROUGH THE USE OF OPAQUE BANDS

[75] Inventor: Donald Castleberry, Schenectady, N.Y.

[73] Assignee: Thomson-LCD, Paris, France

[21] Appl. No.: 211,434

[22] PCT Filed: Oct. 9, 1992

[86] PCT No.: PCT/FR92/00944

§ 371 Date: Aug. 29, 1994

§ 102(e) Date: Aug. 29, 1994

[87] PCT Pub. No.: WO93/07528

PCT Pub. Date: Apr. 15, 1993

[30] Foreign Application Priority Data

Oct. 11, 1991 [FR] France ................................. 91 12586

[51] Int. Cl.⁶ .................................................. G02F 1/1335
[52] U.S. Cl. ........................................................ 359/67
[58] Field of Search ............................. 359/59, 67, 60, 359/74

[56] References Cited

U.S. PATENT DOCUMENTS

| | | | |
|---|---|---|---|
| 4,687,298 | 8/1987 | Aoki et al. | 359/67 |
| 4,733,948 | 3/1988 | Kitahara | 359/67 |
| 4,869,576 | 9/1989 | Aoki et al. | 359/67 |
| 4,948,231 | 8/1990 | Aoki et al. | 359/59 |
| 5,085,498 | 2/1992 | Yamamoto et al. | 359/70 |
| 5,307,189 | 4/1994 | Nishiki et al. | 359/59 |
| 5,323,252 | 6/1994 | Yoshida et al. | 359/67 |
| 5,377,031 | 12/1994 | Vu et al. | 359/67 |
| 5,434,688 | 7/1995 | Saitoh et al. | 359/48 |

FOREIGN PATENT DOCUMENTS

| | | |
|---|---|---|
| 209112 | 1/1987 | European Pat. Off. . |
| 271313 | 6/1988 | European Pat. Off. . |
| 328329 | 8/1989 | European Pat. Off. . |
| 375268 | 6/1990 | European Pat. Off. . |
| 58-159516 | 9/1983 | Japan . |

OTHER PUBLICATIONS

*Liquid Crystal Color Display*, Sugata et al., Proceedings of the SID, vol. 25, No. 4, 1984, New York, NY, pp. 281–286 (no month).

*Primary Examiner*—William L. Sikes
*Assistant Examiner*—Tiep H. Nguyen
*Attorney, Agent, or Firm*—Oblon, Spivak, McClelland, Maier & Neustadt, P.C.

[57] ABSTRACT

A device for improving a contrast of a liquid crystal screen by using an opaque mask. The display screen includes a first plate, on one face of which are deposited elements with controlled transparence or reflectance and thin film components controlling these elements, and a back plate covering a face of the first plate including the elements with controlled transparence or reflectance and the thin film components. The elements are separated by opaque bands into lines and columns forming a grid. The opaque bands are deposited at least partially on the plate including the elements and the thin film components.

19 Claims, 5 Drawing Sheets

DEVICE FOR IMPROVING THE CONTRAST OF A LIQUID CRYSTAL SCREEN AND ITS METHOD OF MANUFACTURE THROUGH THE USE OF OPAQUE BANDS

BACKGROUND OF THE INVENTION

1. Field of the Invention

The subject of the present invention is a device for improving the contrast of a liquid crystal screen by using an opaque mask (commonly called "Black Matrix") and its method of manufacture.

2. Discussion of the Background

A liquid crystal screen consists of a number of liquid crystal cells disposed in a matrix lattice. These cells are formed from two support plates, in general made of glass, stuck together by a peripheral seal which makes a cavity with a small thickness (of the order of a few microns) in which the optically active element, the liquid crystal, is situated. The first support plate consists of a substrate containing a first set of electrodes and the thin film control components disposed between these electrodes to which they are connected. The second support plate constitutes a back-plate electrode.

Each cell thus formed functions as an optical valve. The local modification of the transmission or of the reflection of light is obtained by externally applying a voltage between an access contact of the plate and a contact of the back plate. This voltage gives rise to an electric field between the opposite electrodes and activates the volume of liquid crystal situated between the two electrodes which modifies to a greater or lesser extent the characteristics of the light which passes through it.

In the rest of the text, the term Pixel (short for Picture Element in English) is used to mean the cell forming the elementary image or display point constituted by the electrode, the liquid crystal, the back-plate electrode, the control component and the connections of the component with the peripheral electronics.

The active surface of the Pixel is the surface covered by the electrode and the liquid crystal on which the desired electrooptical effects are obtained; this surface may be larger or smaller in area than the effective surface of the electrode because the edge effects around the electrode may either increase or diminish the surface area of the active zone (these variations being of the order of 1 μm short of or beyond the zone covered by the electrode).

The noncontrolled surface of the Pixel is constituted by the whole surface of the Pixel outside the active surface previously defined.

The use of an opaque mask (or Black Matrix), for improving the contrast, in order to hide the interstices of a liquid crystal or cathode ray tube display is known. In the case of a liquid crystal screen it is a mask covering the noncontrolled surfaces of the Pixels. This opaque mask, which may be made of a reflecting material, blocks the transmission of the light over the uncontrolled matrix surface and allows the contrast of the screen to be improved.

In the prior art, this opaque matrix mask is drawn on the glass back plate constituting the back-plate electrode of the cell. During this method of manufacture, this glass back plate is positioned with respect to the plate forming the substrate on which the electrodes are deposited and stuck to this plate by a peripheral seal. The precision of this positioning is in general limited to within 5 μm. In order to integrate this uncertainty due to the method of sticking used, the opaque mask which is superimposed over the pixels must be oversized with respect to the dimensions of the noncontrolled surface and will obscure a not insignificant part of the active surface of these pixels. For medium or good resolution screens, that is to say screens whose lattice pitch is of the order of 150 to 250 μm, as in the case of direct vision screens, transmission of the light is not significantly reduced. For so-called high definition screens, by contrast, as for projector screens, this loss of active surface causes a significant loss of transmission of the light. For example for a screen with a 50 μm pitch, the active surface of the pixels will measure approximately 40 μm on each side, i.e. 64% of the total surface area of the pixel. If the opening in the opaque mask extends 10 μm beyond the active surface of the pixels, this now represents only 36% of the total surface area of the pixel.

SUMMARY OF THE INVENTION

The invention proposes to reduce this loss of active surface by placing at least one part of the opaque mask (or Black Matrix) on the substrate on which the cells and control components are also formed. The technology used for depositing the various thin films on the substrate are technologies of the type used in manufacturing integrated circuits in which the equipment has precisions of the order of 0.5 μm. This increase in precision diminishes the loss of active surface.

BRIEF DESCRIPTION OF THE DRAWINGS

The invention will be better understood and other advantages will emerge on reading the description which is to follow, is given without implying a limitation and is accompanied by the following attached drawings.

DESCRIPTION OF THE PREFERRED EMBODIMENTS

Figure 1:
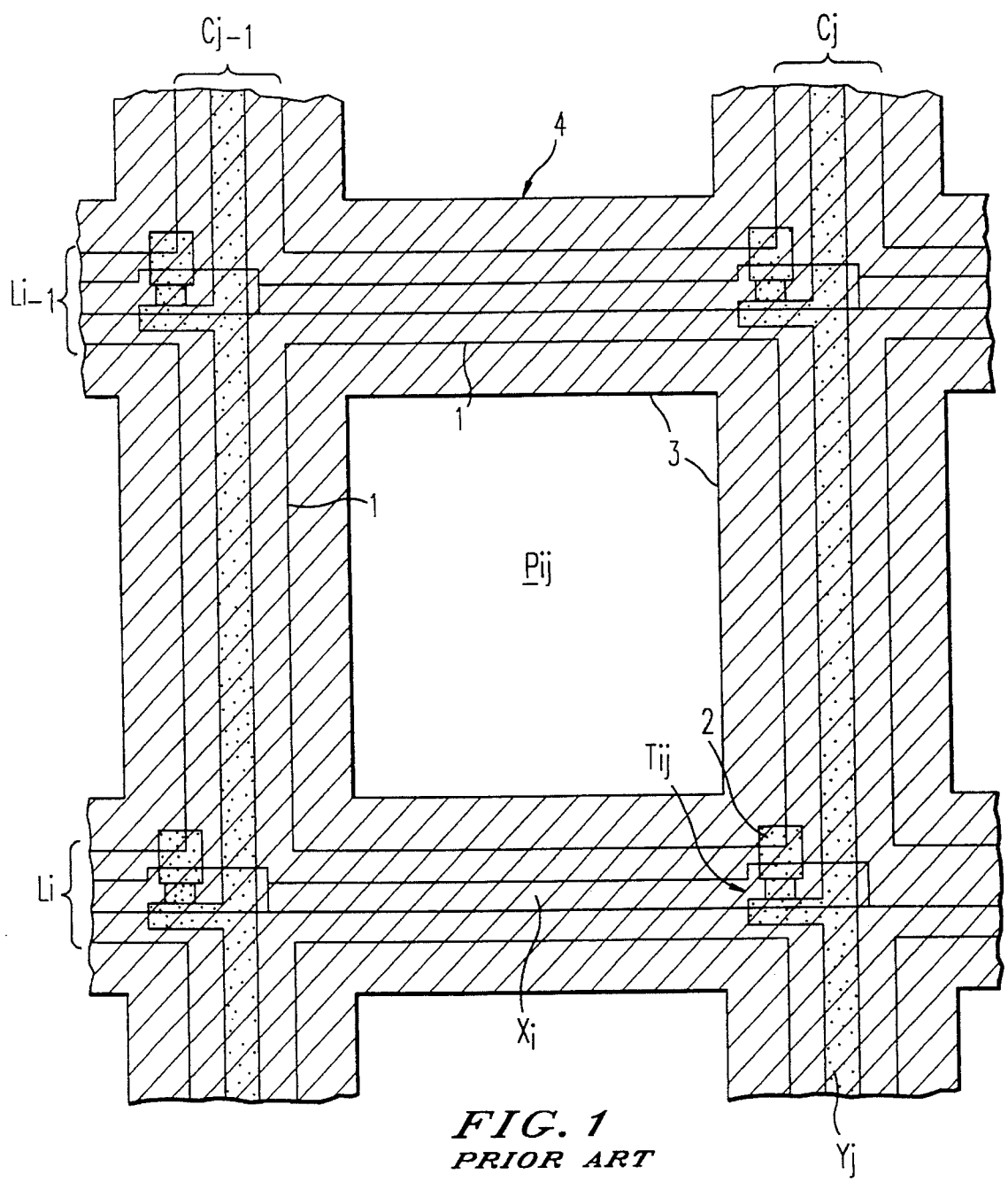
FIG. 1 represents the positioning of an opaque mask with respect to the noncontrolled matrix surface of a prior art liquid crystal screen.

FIG. 1 represents a part of the matrix lattice including elements with controlled transparence or reflectance and their control components.

In order not to burden the description, we will consider only a single component element assembly labelled ij, it being of course the case that the second description applies to all the other components-element assemblies of the matrix lattice.

The contiguous elements $P_{ij}$ are carried by a plate constituting the substrate. The detail of a photoelectric cell and its method of manufacture is described hereinbelow.

Each element $P_{ij}$ constitutes an elementary display point and its surface extends between the edges 1, substantially in the shape of a square.

The surface contained between the element $P_{ij}$ and the eight other neighbouring elements appears in the form of lines $L_i$ and columns $C_j$. These lines and these columns carry the connections $X_i$ and $Y_j$ connecting the control components $T_{ij}$ situated at the intersections of these lines $L_i$ and columns $C_j$ to the peripheral control electronics. A component $T_{ij}$ is connected to the corresponding cell $P_{ij}$ via a connection member 2. In the example, the components are thin film transistors (TFT) made of amorphous silicon, but these control components may also be of the type with two terminations such as diodes made of metal-insulator-metal elements, or of the type with three terminations such as transistors made of mono- or polycrystalline silicon, without departing from the scope of the invention.

The elements $P_{ij}$ with controlled transparence or reflectance may be liquid crystal cells whose electrooptical effects modulating transmission of the light by the cell are mechanisms of the type acting on the polarization of the light such as the helical nematic mode, electrically controlled birefringence (ECB) or the ferroelectric mode, or alternatively of the type acting on the scattering or absorption of the light.

The screen considered here is a so-called high resolution screen whose lattice pitch is of the order of 40 to 100 µm and the noncontrolled surfaces 8 to 20 µm, but the invention may apply to any type of low, medium or high resolution screens.

According to the prior art, there is superposed over the elements $P_{ij}$ an opaque mask 4 whose surface is represented by a hatched area in FIG. 1. This opaque mask 4 is pierced with windows through the openings of which the active surfaces of the elements $P_{ij}$ appear. It is etched on the back plate with an inaccuracy which may be of the order of ±0.1 µm since it is possible to use etching technologies of the photolithography type, but the ±5 µm inaccuracy of the method of sticking the plate and the back plate requires an oversizing of 5 µm of the opaque mask with respect to the noncontrolled surfaces. This leads to a reduction in the active surface of the corresponding elements $P_{ij}$, in FIG. 1 at the surface contained between the edges 1 and 3.

Figure 2:
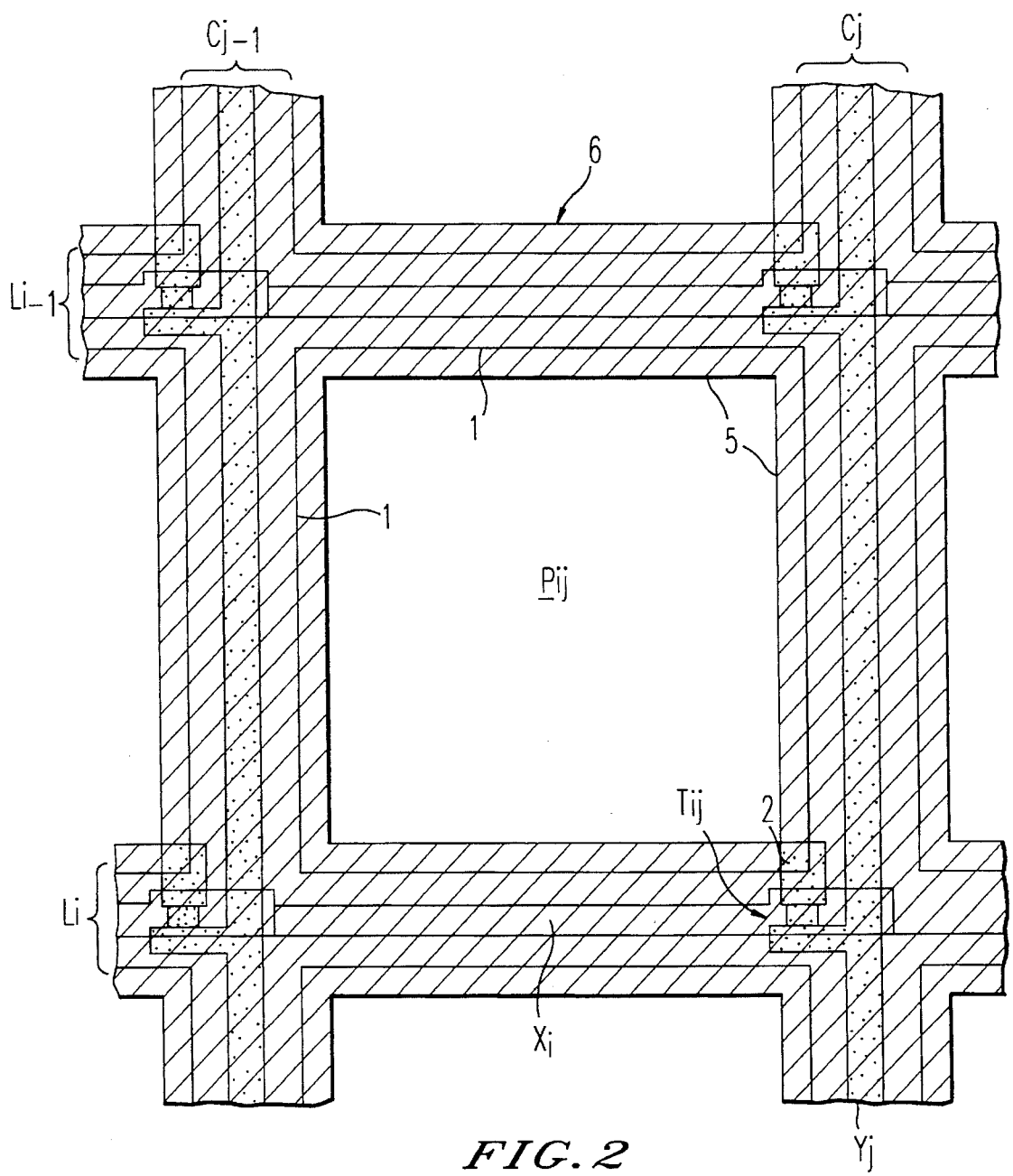
FIG. 2 represents the positioning of an opaque mask with respect to the noncontrolled matrix surface of a liquid crystal screen according to a first embodiment of the invention.

In FIG. 2, the black mask 6 has been produced entirely from thin films on the plate where the control components are deposited during a single step of the manufacturing method. It is represented by a hatched area in FIG. 2 and completely covers the uncontrolled surface of the screen which the lines $L_i$ and the columns $C_j$ constitute. This mask therefore has the form of an opaque criss-cross network dividing the screen into as many display elements as there are elements $P_{ij}$. Since its method of manufacture is of the type used for deposition, photolithography and etching thin films, the precision of the alignment of this mask with respect to the noncontrolled surface of the screen which is itself produced in thin films is of the order of 0.5 µm (and may be up to 3 µm) and allows a low loss of active surface of the element $P_{ij}$ corresponding to the surface contained between the edges 1 of the lines $L_i$ and the columns $C_j$ and the free edges 5 of the opaque mask 6.

The latter may be deposited directly onto the substrate plate and the components $T_{ij}$ as well as the contact lines $X_i$ and $Y_j$ above, or alternatively it may be disposed on the components $T_{ij}$ and the contact lines $X_i$ and $Y_j$, which are themselves directly deposited on the substrate plate.

In all cases, when the opaque mask 6 consists of a conducting material, it is necessary to insulate it from $X_j$, $Y_j$ and $T_{ij}$ by a film of insulator.

Figure 3:
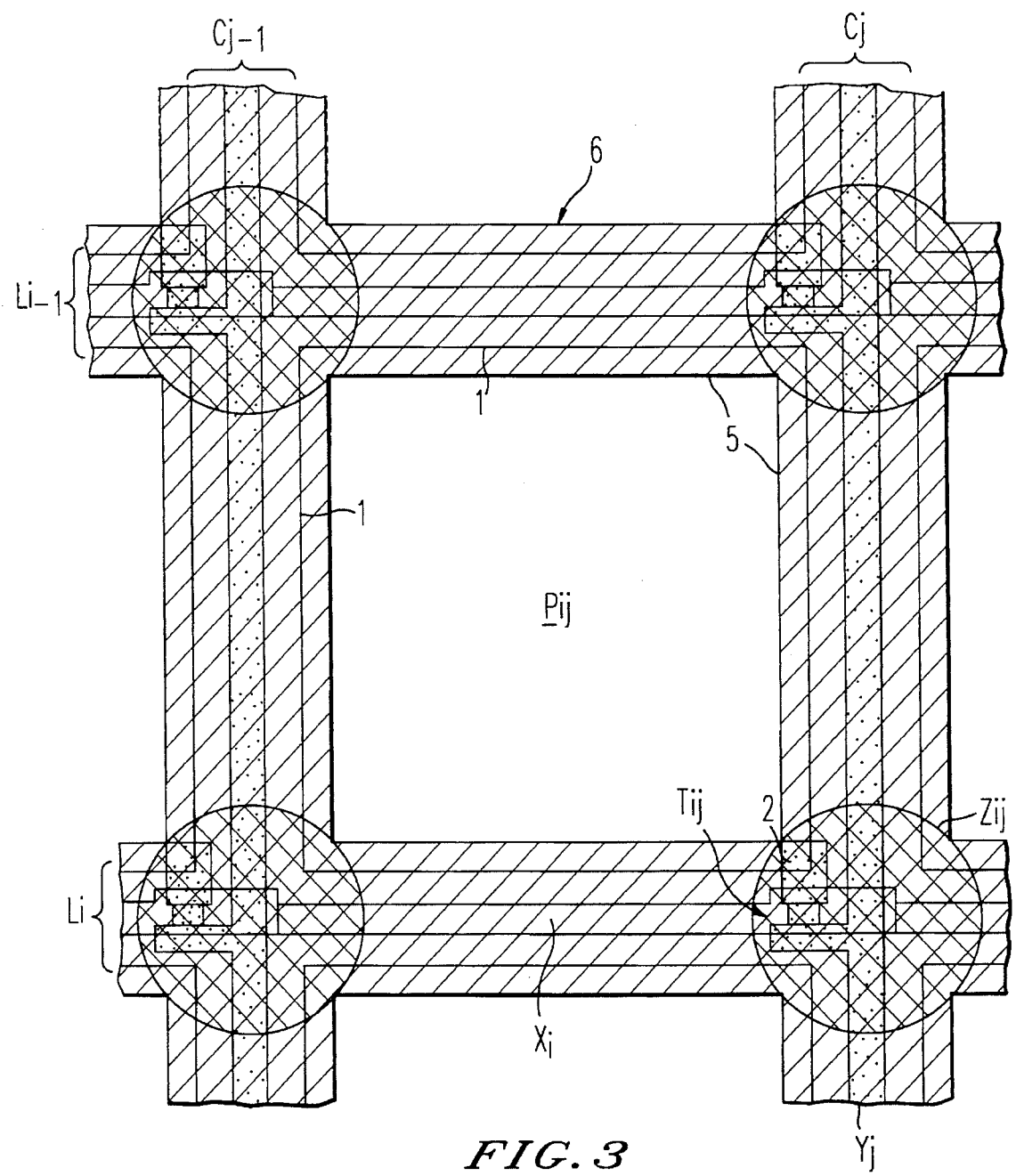
FIG. 3 represents the positioning of an opaque mask with respect to the noncontrolled matrix surface of a liquid crystal screen according to a second embodiment of the invention.

The black mask represented in FIG. 3 by a hatched area has been produced in two parts; one, the part 6, has been deposited in thin films on the substrate plate on or under the components $T_{ij}$ and the contact lines $X_i$ and $Y_j$ and corresponds exactly to the black mask 6 described in FIG. 2, and the other part has been deposited on the back plate. The part 6 therefore totally covers the lines $L_i$ and the columns $C_j$ and the losses of active surfaces of the elements $P_{ij}$ correspond to the surface contained between the edges 1 and 5. The second part of the opaque mask consists of zones $Z_{ij}$ covering the components $T_{ij}$. These zones $Z_{ij}$ may be of various shapes such as a round, square, hexagonal or any other shape, the only constraint being that they cover the components $T_{ij}$.

These zones may be etched directly on the back plate, the back-plate electrode covering them, or alternatively they may be etched on the back-plate electrode, which is itself deposited directly on the back plate, and cover the part of the noncontrolled zone which is not covered by the segments $S_{ij}$ and $S'_{ij}$.

This embodiment has the advantage of protecting from outside light the components $T_{ij}$ which may be photosensitive or which may have been manufactured from materials which may be damaged through prolonged contact with light.

Figure 4:
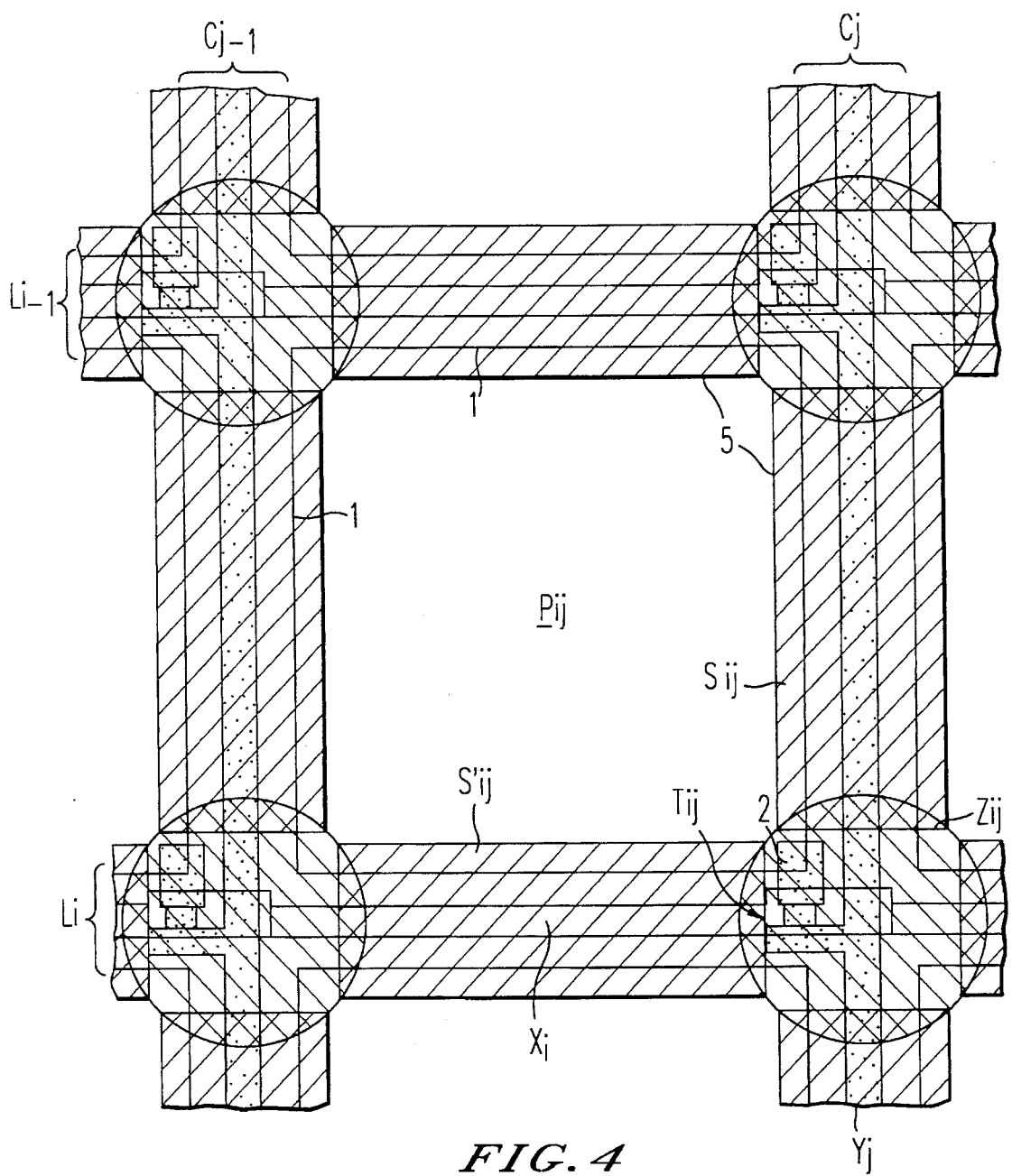
FIG. 4 represents the positioning of an opaque mask with respect to the noncontrolled matrix surface of a liquid crystal screen according to a third embodiment of the invention.

The opaque mask in FIG. 4 has been produced in two parts. It includes on the one hand vertical $S_{ij}$ and horizontal $S'_{ij}$ segments covering the lines $L_i$ and the columns $C_j$ between the components $T_{ij}$ which are situated at the intersections between these lines and columns and, on the other hand, the zones $Z_{ij}$, and covering the components $T_{ij}$ joining the consecutive segments. These zones are identical to those in FIG. 3. The segments $S_{ij}$ and $S'_{ij}$ are deposited on the substrate plate and thus allow a low loss of active surface of the elements $P_{ij}$ corresponding to the surface between the edges 1 and 5. The length of this covering surface is of the order of 0.5 µm and 3 µm. They are of rectangular shape but may have any other shape, so long as they cover the part of the noncontrolled surface situated between the edges of the neighbouring elements $P_{ij}$ and between the components $T_{ij}$. The zones $Z_{ij}$ are deposited on the back plate, and cover the part of the noncontrolled zone which is not covered by the segments $S_{ij}$ and $S'_{ij}$.

This structure has the advantage of allowing elimination of short-circuits in the contact lines by using a laser.

In effect, with the preceding cases, the repair work which consists in insulating the defective element because of a short circuit between a line $X_i$ and a column $Y_j$ would be impossible because, for this, a laser is used which by cutting this line or this column puts it in contact with the opaque frame which may be a conductor and is situated above or below it. The configuration of the black frame according to FIG. 4 makes zones where cutting by laser is possible without creating fatal short circuits.

Figure 5:
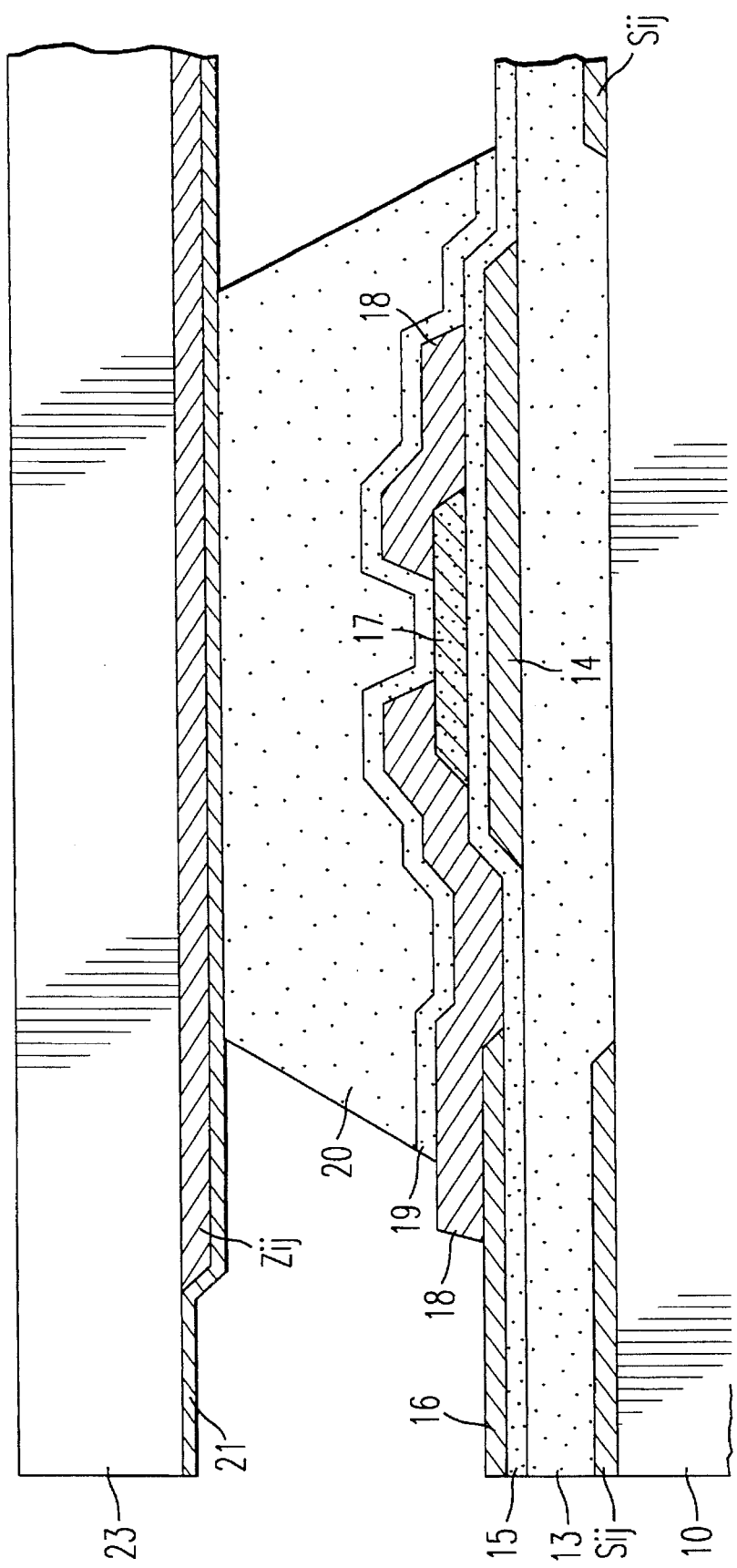
FIG. 5 represents a cross-section of a liquid crystal screen fitted with an opaque mask device according to the third embodiment of the invention.

FIG. 5 shows an embodiment of the opaque mask described in FIG. 4 by a cross-section of a component $T_{ij}$ of a known type of thin film transistor, and controlling a liquid crystal cell. In this FIG. 5, the element with controlled transparence or reflectance is a liquid crystal cell operating in transmissive mode but this element could be a liquid crystal cell operating in reflective or transflective mode without departing from the scope of the invention. This screen corresponds to the one described in connection with FIG. 4. One method of manufacture of a pixel described in the previous paragraph includes the following steps:

1—Preparation of the substrate plate 10 and the back plate 23;

2—Deposition, photolithography and etching of an opaque material (titanium, chromium, molybdenum, aluminium tungsten for example), over a thickness of the order of 500 to 3,000Å on the plate 10 in order to form the segments $S_{ij}$ and $S'_{ij}$ and on the back plate 23 in order to form the zones $Z_{ij}$.

3—Deposition, photolithography and etching of an insulating material 13 (silicon dioxide or silicon nitride for example), to a thickness of the order of 0.5 to 2 μm on the segments $S_{ij}$ and $S'_{ij}$ of the mask, producing their insulation.

4—Deposition, photolithography and etching of one or more conducting materials to a thickness of the order of 200 to 3,000Å producing the gate 14 of the transistor.

5—Deposition of a sandwich of a thickness of the order of 1,000 to 5,000Å of an insulating material producing the insulator 15 (silicon oxide or silicon nitride for example), of amorphous silicon (a-Si) and of n+ doped silicon (n+Si) producing the semiconductor film 17.

6—Photolithography and dry etching of the n+Si and a-Si.

7—Photolithography and dry etching of the insulator 15;

8—Deposition, photolithography and wet etching of the Indium Tin oxide (ITO) to a thickness of the order of 300 to 3,000Å producing the electrode 16 on the plate 10 and the back-plate electrode 21 on the back plate 23.

9—Deposition, photolithography and wet etching of a conducting material to a thickness of the order of 500 to 5,000Å producing the sources and drains 18;

10—Dry etching of the n+.

11—Tests and repair work;

12—Deposition of an insulating material to a thickness of the order of 300 to 5,000Å producing the passivation film 19.

13—Deposition, photolithography and wet etching of a polyimide type material often called LBL (for Light Blocking Film) to a thickness of the order of 3 to 6 μm producing the film 20 whose function is to create a space between the electrode 16 and the electrode 21 for the liquid crystal and furthermore blocks the photosensitivity of the component.

14—Etching of the insulating material of the film 19.

15—Deposition and abrasion of the alignment polyimide on the plate 10 as well as on the back plate 23.

16—First cutting of the plate 10 and final cutting of the back plate 23.

17—Assembly of the plate 10 and the back plate 23.

18—Filling the space between the electrodes 16 and 21 with liquid crystal.

19—Pressing the two plates against each other.

20—Sealing by a peripheral seal of adhesive.

21—Final cutting of the plate 10.

In the case where the segments $S_{ij}$ and $S'_{ij}$ are deposited on the components $T_{ij}$ and the contact lines $X_i$ and $Y_j$, the third step and the deposition, photolithography and etching of a conducting material producing the opaque mask which are described in the second step will be carried out after the twelfth step.

In the case where the zones $X_{ij}$ are deposited above the back-plate electrode 21, which is itself directly deposited onto the back plate 23, the deposition, the photolithography and the wet etching, which are described in the second step, of the opaque material used to constitute these zones $Z_{ij}$ will be carried out after the eighth step.

The present invention applies to any type of display screens modulating light using matrix addressing.

I claim:

1. A display screen comprising:

a first plate on one face of which are deposited electrodes, thin film components controlling the electrodes and contact lines to which the thin film components are connected;

a back plate comprising a counter-electrode covering a face of the first plate;

a liquid crystal material formed between the first plate and the back plate; and opaque bands separating the deposited electrodes into lines and columns forming a criss-cross network, and the opaque bands being deposited at least partially on the first plate and partially on the back plate, at least a part of the opaque bands being deposited under the thin film components and the contact lines.

2. A display screen comprising:

a first plate on one face of which are deposited electrodes, thin film components controlling the electrodes and contact lines to which the thin film components are connected;

a back plate comprising a counter-electrode covering a face of the first plate;

a liquid crystal material formed between the first plate and the back plate;

opaque bands separating the deposited electrodes into lines and columns forming a criss-cross network, and the opaque bands being deposited at least partially on the first plate, at least a part of the opaque bands being deposited under the thin film components and the contact lines; and opaque zones deposited on the back-plate to cover the thin film components.

3. The display screen according to claim 2, wherein the opaque bands cover the deposited electrodes over a width of 0.5 to 3 microns.

4. The display screen according to claim 2, wherein the opaque zones have a circular, square or hexagonal shape.

5. The display screen according to claim 2, wherein the opaque bands and opaque zones are at least partially made from a metal selected from the group consisting of titanium, chromium, molybdenum, aluminum and tungsten.

6. The display screen according to claim 2, wherein the thin film components comprise two terminations.

7. The display screen according to claim 2, wherein the thin film components comprise three terminations.

8. The display screen according to claim 2, wherein the display screen is a projection or direct vision screen.

9. A display screen comprising:

a first plate on one face of which are deposited electrodes, thin film components controlling the electrodes and contact lines to which the thin film components are connected;

a back plate comprising a counter-electrode covering a face of the first plate;

a liquid crystal material formed between the first plate and the back plate; and opaque bands separating the deposited electrodes into lines and columns forming a criss-cross network, wherein the opaque bands comprise first segments extending between neighboring thin film components while covering corresponding contact lines of the neighboring thin film components, and second segments covering the thin film components while masking an interval between two consecutive first segments.

10. The display screen according to claim 9, wherein the first opaque segments are deposited on or below the contact lines.

11. The display screen according to claim 9, wherein the second opaque segments are deposited on the back plate and cover the thin film components.

12. The display screen according to claim 9, wherein the second opaque segments are deposited under the counter-electrode.

13. The display screen according to claim 9, wherein the second opaque segments are deposited on the counter-electrode which is deposited directly on the back plate.

14. The display screen according to claim 9, wherein the first opaque segments cover the deposited electrodes over a width of 0.5 to 3 microns.

15. The display screen according to claim 9, wherein the second opaque segments have a circular, square or hexagonal shape.

16. The display screen according to claim 9, wherein the first and second opaque segments are at least partially made from a metal selected from the group consisting of titanium, chromium, molybdenum, aluminum and tungsten.

17. The display screen according to claim 9, wherein the thin film components comprise two terminations.

18. The display screen according to claim 9, wherein the thin film components comprise three terminations.

19. The display screen according to claim 9, wherein the display screen is a projection or direct vision screen.

* * * * *